(12) United States Patent
Beechie et al.

(10) Patent No.: US 8,485,941 B2
(45) Date of Patent: Jul. 16, 2013

(54) DRIVER SELECTABLE LOW SPEED MODE FOR DISABLING STOP/START TECHNOLOGY

(75) Inventors: Brian E. Beechie, Armada, MI (US); John D. Mueller, Southfield, MI (US); Jeffrey M. Orzechowski, Troy, MI (US); Anurag Peter Varma, Royal Oak, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 243 days.

(21) Appl. No.: 13/042,504

(22) Filed: Mar. 8, 2011

(65) Prior Publication Data

US 2012/0231927 A1 Sep. 13, 2012

(51) Int. Cl.
*B60W 10/04* (2006.01)
*B60W 10/10* (2012.01)

(52) U.S. Cl.
USPC ............................................ 477/110; 477/99

(58) Field of Classification Search
USPC ................. 477/99, 107, 110, 111; 701/54
See application file for complete search history.

(56) References Cited

U.S. PATENT DOCUMENTS

| 4,362,133 | A | * | 12/1982 | Malik | 477/99 |
| 4,421,082 | A | * | 12/1983 | Katayose et al. | 123/333 |
| 4,449,495 | A | | 5/1984 | Fiala | |
| 2001/0006922 | A1 | * | 7/2001 | Scarlata | 477/99 |
| 2003/0087724 | A1 | * | 5/2003 | Seibertz et al. | 477/92 |
| 2011/0237391 | A1 | * | 9/2011 | Burdeti | 477/110 |

FOREIGN PATENT DOCUMENTS

| DE | 3025539 A1 | 1/1982 |
| DE | 102006042606 A1 | 3/2008 |
| EP | 1770266 A1 | 4/2007 |

OTHER PUBLICATIONS

International Search Report and The Written Opinion dated Jun. 6, 2012 for International Application No. PCT/US2012/028042, International Filing Date Mar. 7, 2012.

* cited by examiner

*Primary Examiner* — Justin Holmes
(74) *Attorney, Agent, or Firm* — Frederick A. Krieger

(57) ABSTRACT

A driver controllable low speed mode for a stop/start technology-equipped vehicle. The vehicle comprises an internal combustion engine with stop/start technology having an engine controller, a transmission connected to the internal combustion engine, and a shifter connected to the transmission and the engine controller. The shifter is operable to place the transmission into one of a plurality of operating modes, the operating modes including at least a low speed mode wherein stop/start technology is disabled. The engine controller is operable to detect vehicle operation above a speed or acceleration threshold and cause an audible chime or message to be played or a visual cue displayed to prompt the driver to deactivate the low speed mode. The engine controller is further operable to detect a sustained acceleration attempt when the transmission is in low speed mode and to disable low speed mode for a predetermined period of time upon this detection.

20 Claims, 6 Drawing Sheets

DRIVER SELECTABLE LOW SPEED MODE FOR DISABLING STOP/START TECHNOLOGY

FIELD

The present disclosure relates to electric starter-based stop/start technology for internal combustion engines, and associated vehicle powertrains.

BACKGROUND

Stop/start technology automatically conserves energy by shutting off the gasoline engine when conditions permit, such as when the vehicle is stopped or coasting. The feature improves fuel economy and reduces emissions. This is most advantageous for vehicles which spend significant amounts of time waiting at traffic lights or frequently come to a stop.

Typically, existing stop/start system-equipped engines enable the driver to either inadvertently or directly shut off the system e.g., with a switch or button. Allowing a driver to disable the functionality, however, potentially compromises benefits from use of the system during normal operation of the vehicle. This is true even when this functionality is implemented as a momentary switch, i.e., one that resets each key cycle. Further, existing systems also do not allow a stop-start system-equipped engine to "creep" (move slowly) without at least one engine shutdown. This can be a nuisance during parking maneuvers.

SUMMARY

In one form, the present disclosure provides a driver selectable low speed mode for disabling stop/start technology active on a powertrain of an internal combustion engine-driven vehicle. The mode enables a vehicle to be moved at limited speeds without inconveniencing the driver with frequent and inadvertent engine off cycles. Driver selection of the mode is communicated to an engine controller, which disables the stop/start technology by signalling a stop/start controller and implementing a speed threshold. It should be noted that because the mode is operatively limited, it does not inhibit the stop/start system during normal and regular use. Thus, fuel economy during normal operation is not compromised.

The driver selectable low speed mode is generally implemented through an extra detent position on a standard shifter labeled with a "Low Speed" or "LS" indicator, or the like. The "Low Speed" detent can be positioned in a number of ways: it can be located immediately before "Drive", i.e., after "Neutral," after "Drive", i.e., before a gear-limited drive, or, it can be positioned so that the driver is required to move the shifter left or right of "Drive". In transmissions with a manual gear simulating mode ("tiptronic"), the "Low Speed" mode can be activated by actuating the shifter in an opposite direction (i.e., to the left of "Drive", instead of right, which activates the manual gear simulating mode). The mode could also be activated in such manual gear simulating transmissions by downshifting from the first available gear to the low speed mode, using a button or switch engaged when the transmission has been placed in "Drive", or as a separate detent on a true manual transmission shifter.

In addition, similar to shifting back into "Neutral" once "Drive" is engaged, a transmission shift lock can be disabled for shifting from "Low Speed" to "Drive." This allows the driver to smoothly transition the transmission into "Drive" without pressing on the brake pedal.

To prevent the driver from using the low speed mode to drive the vehicle with stop/start technology completely disabled, audible or visual cues can be presented to the driver when the vehicle exceeds a threshold speed, so as to alert the driver that low speed mode is enabled. Generally, the speed is limited to 6 mph (10 km/h). These audible or visual cues will prompt the driver to reengage "Drive," thus reenabling stop/start functionality. The cues, which can be communicated through an audio system or driver notification system (i.e., a dashboard interface), can be repetitively displayed or played until the driver reengages "Drive." If, after a predetermined amount of time, e.g., 1-2 minutes, the user has not physically reengaged "Drive," the system can automatically reengage "Drive," disabling the low speed mode.

Activating low speed mode can be programmed to trigger a number of other changes in vehicle function. For instance, an in-car navigation system can be disabled or commanded to prohibit destination entry. Additionally, when the driver attempts to operate the vehicle above speed or acceleration threshold, an audible chime or message can be played via an audio system of the vehicle to remind the driver that he or she is in the low speed mode.

In addition to the audible or visual cues discussed above, other methods to prevent the driver from disabling stop/start in normal operation can be used, for instance, a speed or acceleration adjustment may be engaged after a predetermined period of time. This adjustment can be implemented by a variety of means, e.g., modifying acceleration control. This enables the customer to defeat the stop/start feature when parking or "creeping", without hurting fuel economy during normal driving.

With a driver controllable low speed mode, there can be no mistake that stop/start is functioning during expected scenarios. A known issue with the stop/start feature as presently implemented is the complicated logic behind it: stop/start will only operate at prescribed ambient temperatures, coolant temperatures, HVAC settings, battery state-of-charge, vehicle speed, etc. The driver controllable low speed mode does away with this complicated logic and provides a simpler control method. For instance, whereas in vehicles with more complicated logic, stop/start might be disabled in stop-and-go traffic, in the present system, stop/start will continue to function unless the driver specifically puts the vehicle into the low speed mode.

Recognizing that the driver may, in an emergency, need low speed mode to be temporarily disabled (i.e., the driver has pulled out into traffic but forgotten to put the transmission back into "Drive"), the engine controller can be programmed to recognize that the driver has left the shifter in the "Low Speed" position but attempted to accelerate as if the transmission was in "Drive." For instance, a measurement of accelerator pedal pressure can be taken and compared to a threshold. In such a case, an audible chime or message can be played, and the low speed mode disabled until the vehicle speed drops below a safe level, at which time the driver can properly and safely put the transmission into "Drive."

Further areas of applicability of the present disclosure will become apparent from the detailed description and claims provided hereinafter. It should be understood that the detailed description, including disclosed embodiments and drawings, are merely exemplary in nature intended for purposes of illustration only and are not intended to limit the scope of the invention, its application or use. Thus, variations that do not depart from the gist of the invention are intended to be within the scope of the invention.

DETAILED DESCRIPTION

Figure 1:
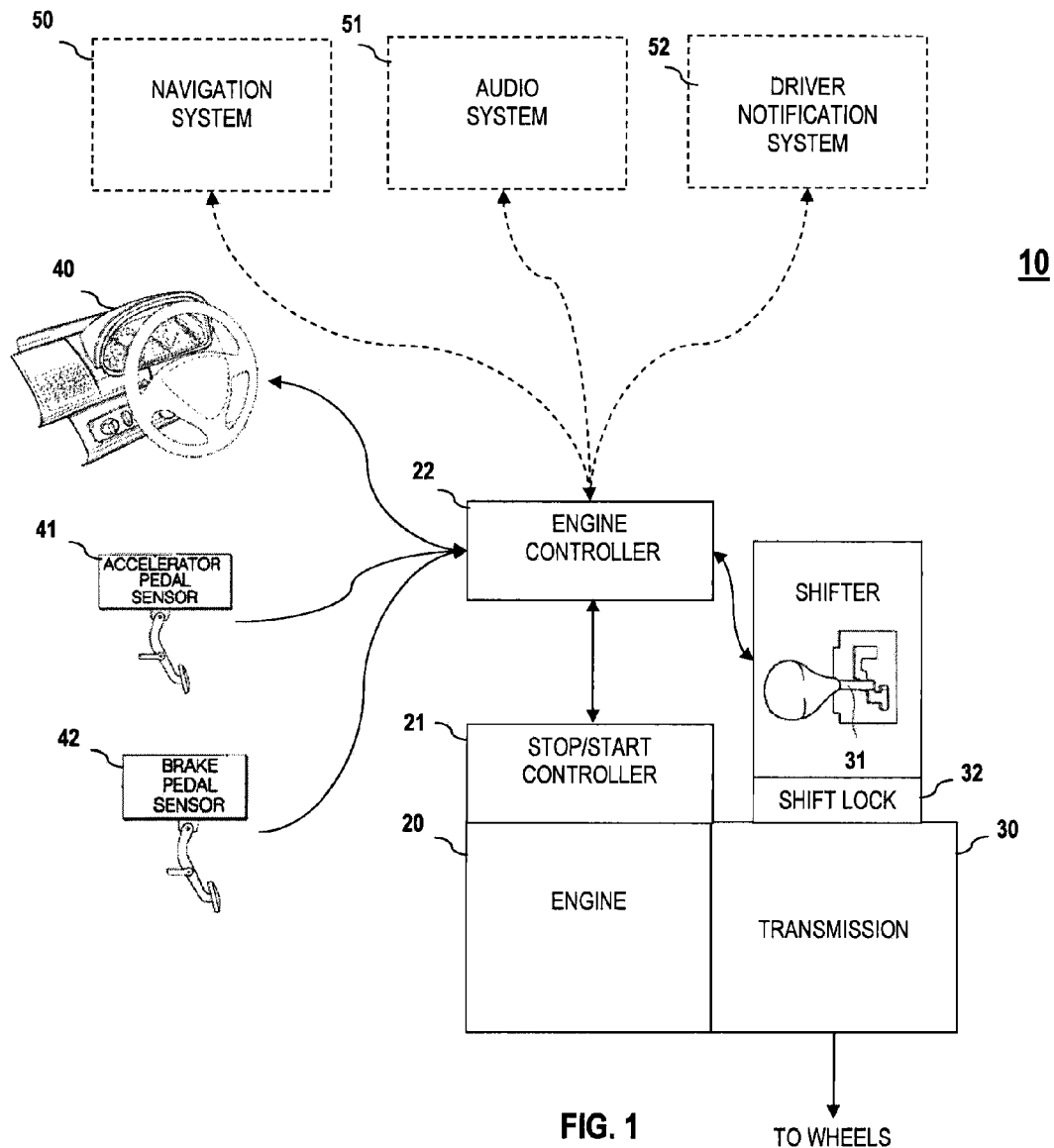
FIG. 1 illustrates a vehicle powertrain having a driver selectable low speed mode, according to the present disclosure.

FIG. 1 illustrates a vehicle powertrain 10 having an engine 20 with stop/start technology and a transmission 30. Engine controller 22 is connected to engine 20 and stop/start controller 21 (generally a part of engine 20) and is operable to control operation of the engine, including its acceleration. Engine controller 22 receives input from a driver console 40 (which includes, among other things, a steering column), an accelerator pedal sensor 41 and a brake pedal sensor 42.

Selection of the low speed mode is accomplished through the transmission shifter 31, which controls transmission 30 and reports mode selection to the engine controller 22. A shift lock 32, discussed below in more detail, may also be included. When low speed mode is selected, engine controller 22 will communicate with stop/start controller 21 to disable stop/start functionality. While low speed mode is enabled, engine controller 22 will monitor speed of the vehicle and determine if the driver exceeds a threshold speed or acceleration. As noted above, the threshold speed is approximately 6 mph (10 km/h). It should be appreciated, however, that the threshold could be lower or higher if desired by the manufacturer. At breach of the threshold, audible chimes can be played and/or messages displayed on navigation system 50, audio system 51, and/or driver notification system 52. In another embodiment, multiple alarms or indicators of increasing intensity could be used to impart to the operator that continued operation in low speed mode is improper.

The engine controller 22 is optionally connected to navigation system 50 so that when low speed mode is selected, engine controller 22 can optionally completely disable navigation system 50 (or limit input to it). As previously noted, engine controller 22 can also adjust accelerator pedal sensor 41 throughput when the vehicle has met or exceeded the speed or acceleration threshold for a predetermined period of time. The driver thus would not be prevented from continuing to accelerate or operate the vehicle, but would receive some level of feedback in the form of decreased available power or torque.

Figure 2A:
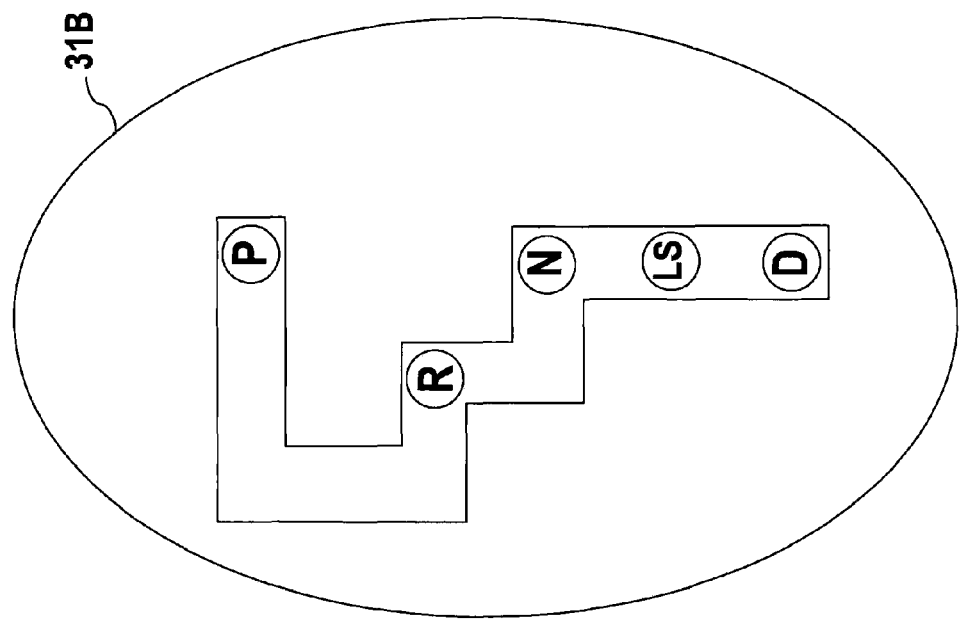
FIGS. 2A-2G illustrates example arrangements of a shifter for the FIG. 1 powertrain.
Figure 2B:
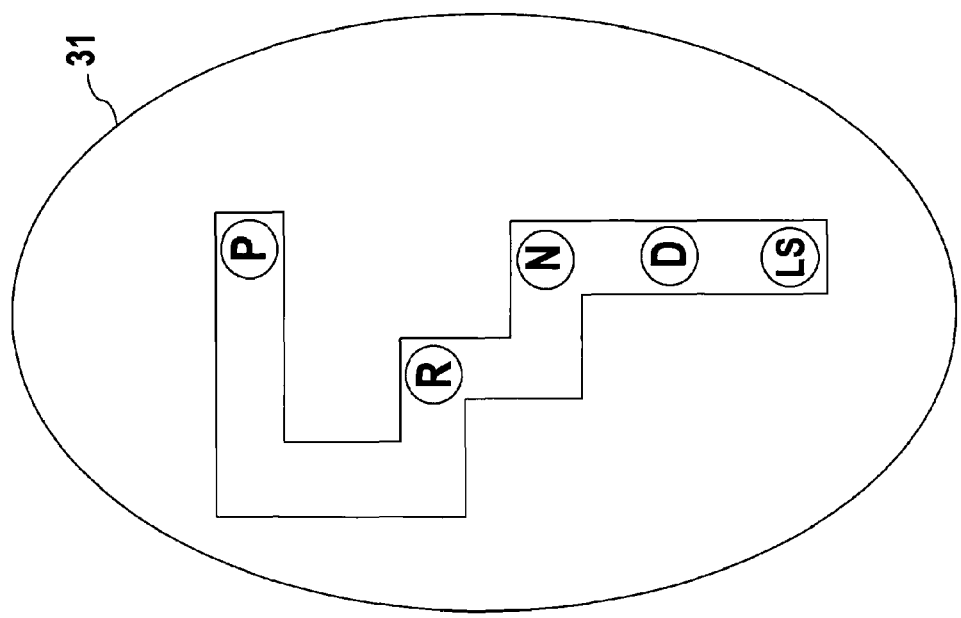
Figure 2D:
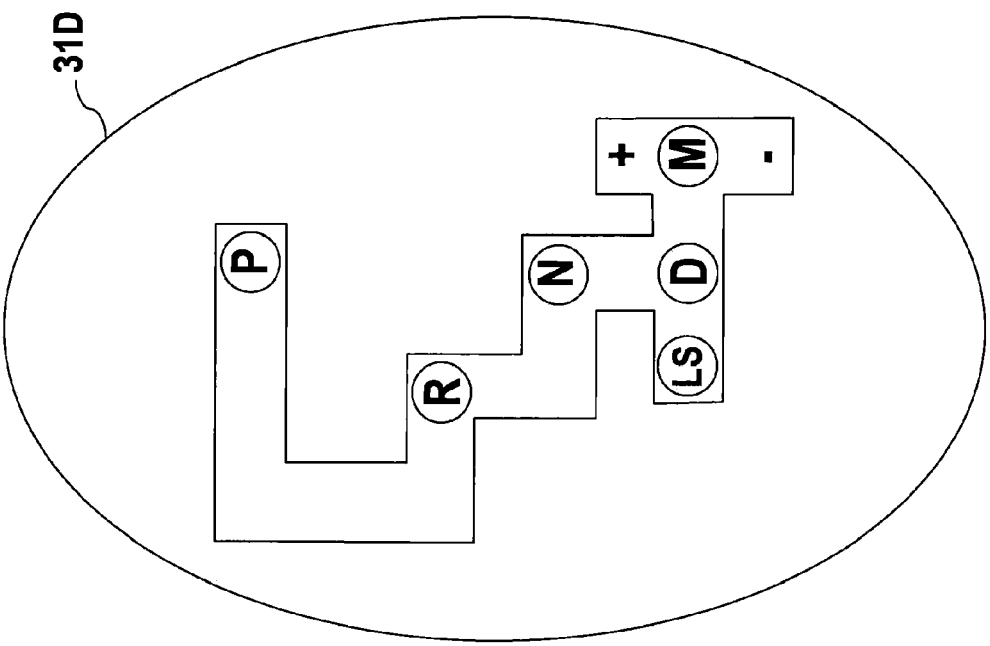

FIGS. 2A-2G illustrates example arrangements of a shifter 31 for the FIG. 1 powertrain having a plurality of detents arranged along a path, one for each operating mode of the transmission 30. FIG. 2A shows shifter 31 with the low speed mode "LS" location positioned after "D" ("Drive") along the mode path of the shifter 31, which also includes "P" ("Park"), "R" ("Reverse"), and "N" ("Neutral") arranged in a conventional manner. Shifter 31B shown in FIG. 2B positions the "LS" location before "D" ("Drive").

Figure 2C:
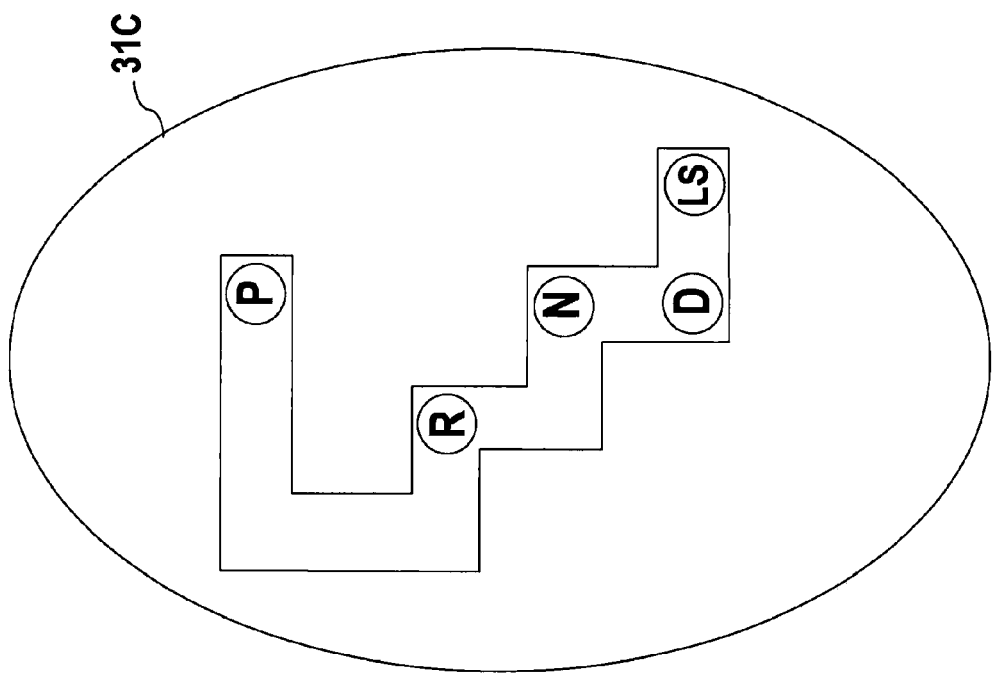

Shifter 31C shown in FIG. 2C positions the "LS" location as a sub-mode of "D" ("Drive"), such that the mode is selectable without deactivating shift lock 32 of the transmission. Generally, the shift lock 32 must be deactivated by pressing down on brake pedal sensor 42, e.g., when shifting the vehicle into any mode from "P" ("Park"). Shifter 31D shown in FIG. 2D positions the "LS" location as a sub-mode of "D" ("Drive") as in FIG. 2C, but adds a manual gear selecting sub-mode "M" as is known in the art. When in the manual sub-mode "M," the driver can shift a gear up (+) or down (−) by moving the shifter up/down.

Figure 2F:
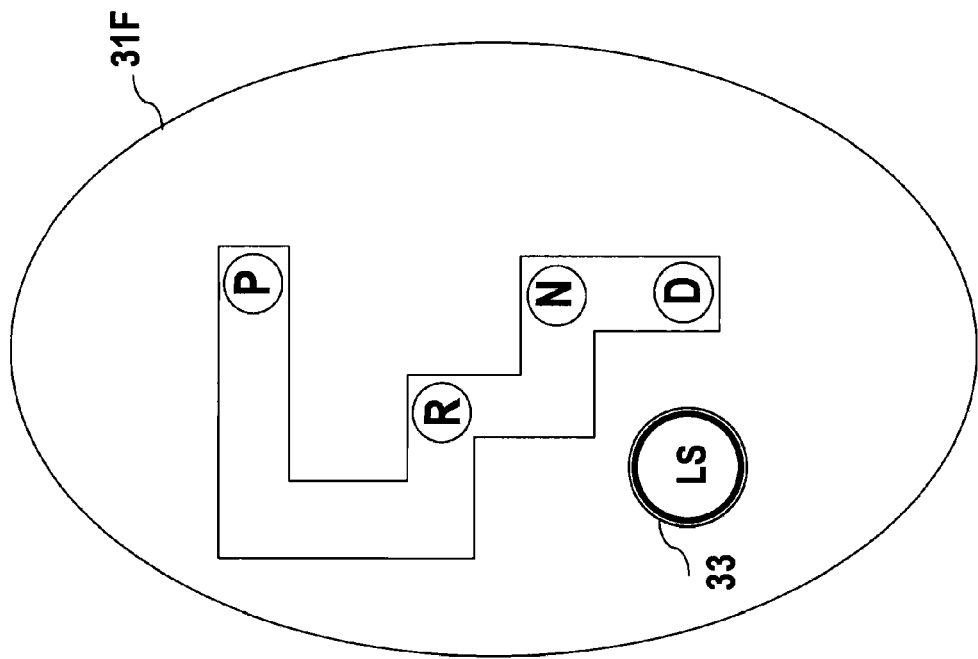
Figure 2E:
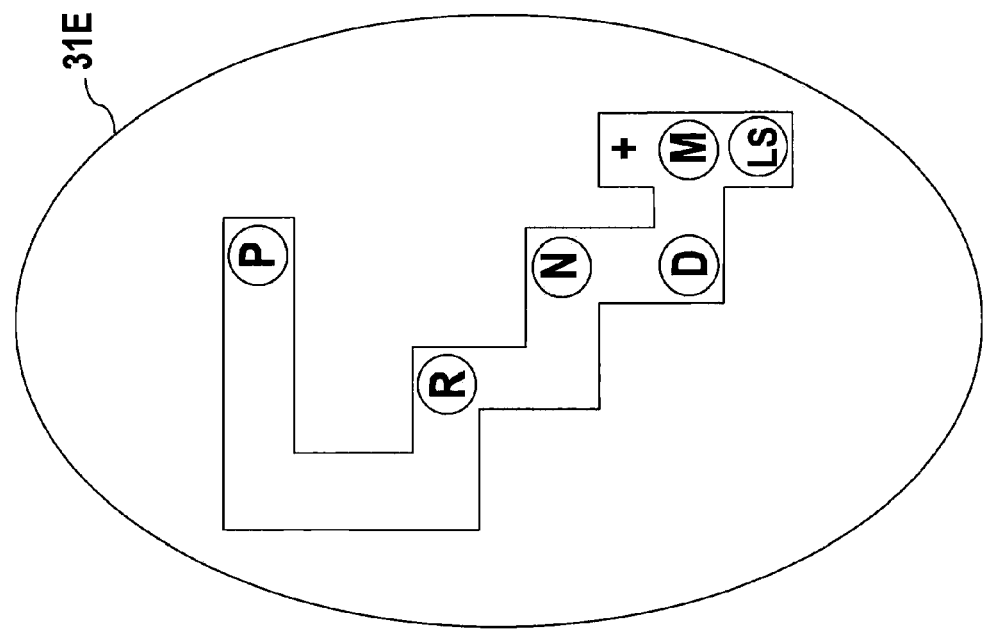
Figure 2G:
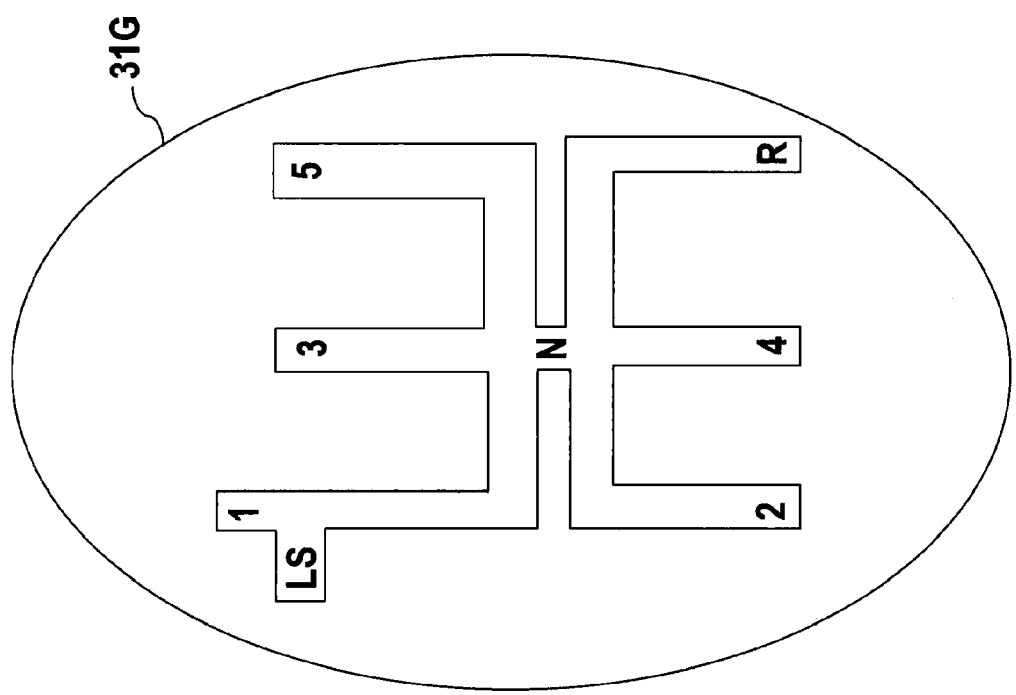

FIG. 2E similarly has a manual gear selecting sub-mode "M", where "LS" is selectable by downshifting below first gear. FIG. 2F permits activation of low speed mode via a button 33 (or other actuation means, i.e., a switch) when the transmission is already in "D" ("Drive"). FIG. 2G illustrates a fully manual gear selection scheme (whether used with a fully manual transmission or electronic double clutch), where "LS" is selectable from the first gear "1" detent.

Figure 3:
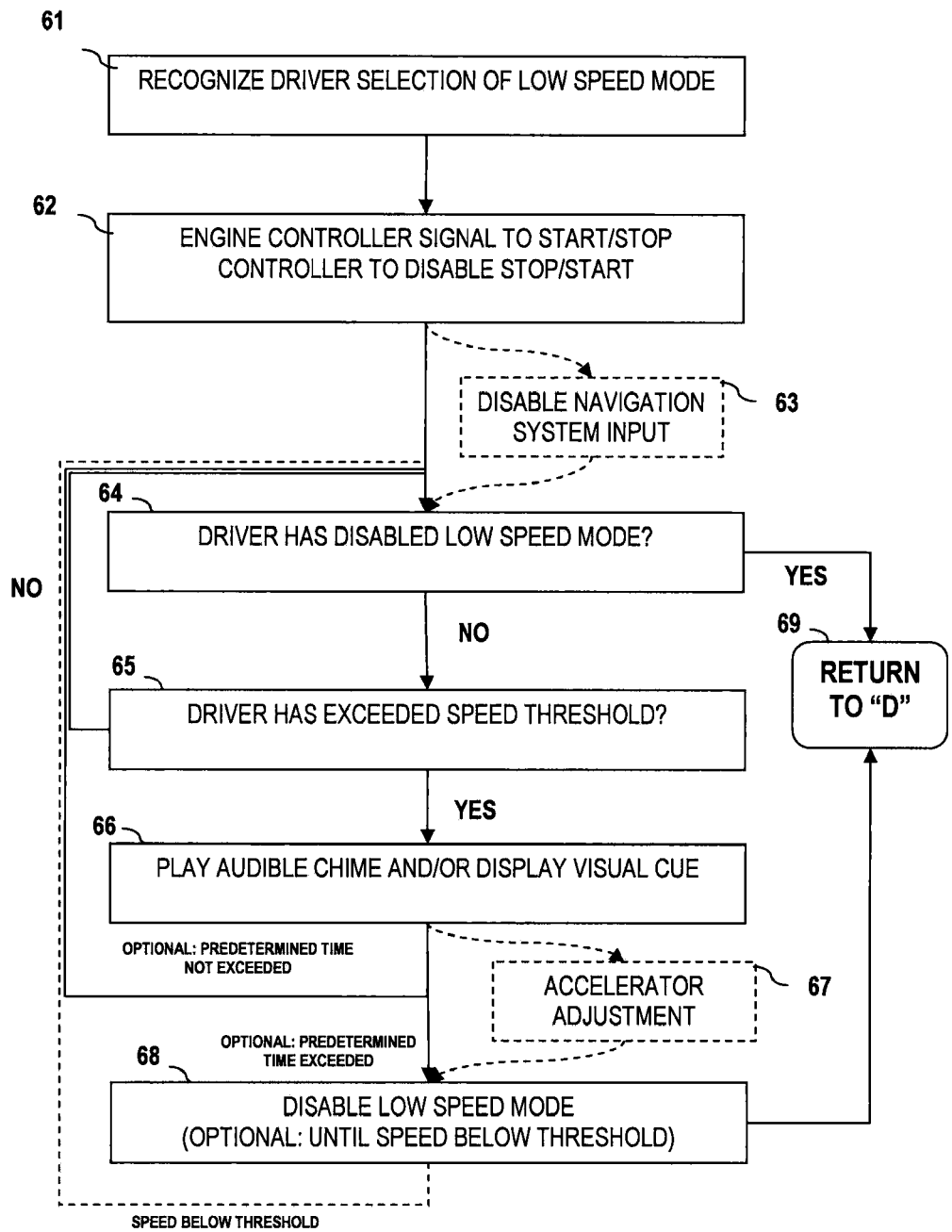
FIG. 3 is a flowchart illustrating exemplary operation of a driver selectable low speed mode, according to the present disclosure.

FIG. 3 is a flow chart illustrating an example operation of a driver selectable low speed mode, as detailed above. First, in step 61, the engine controller 22 recognizes driver selection of low speed mode. Next, at step 62, the engine controller 22 disables stop/start functionality via stop/start controller 21. Optionally, at step 63, engine controller 22 disables navigation system 50 functionality.

Step 64 comprises steps for monitoring whether driver disabled the low speed mode. If the driver has disabled low speed mode, engine controller 22 (at step 69) reenables stop/start functionality via stop/start controller 21, returning the vehicle to standard "D" (Drive). Otherwise, in step 65, engine controller 22 checks to see if the driver has met or exceeded a speed or acceleration threshold. If the driver has not, the method returns to step 64. If the driver has exceeded the speed threshold, an audible chime and/or visual cue is displayed at step 66, and engine controller 22 may optionally begins counting a predetermined time, while returning to step 64 to check for driver disabling of the low speed mode. As can be appreciated, the audible chime or visual cue is replayed each time the sequence completes. The volume or visibility of the chimes or cues can increase in severity each time they are repeated.

If the engine controller 22 is optionally counting the predetermined time, once that predetermined time is exceeded (i.e., the driver has forgotten to disable low speed mode for 1-2 minutes), low speed mode is automatically disabled (steps 68 and 69). Additionally, acceleration adjustment can be implemented (step 67). It should also be noted that the low speed mode can be disabled only temporarily, until the vehicle speed again drops below the speed threshold. At that point, the method can return to step 64 and continues monitoring for driver disabling of the low speed mode.

What is claimed is:

1. A vehicle powertrain comprising:
   an internal combustion engine with stop/start technology, wherein the stop/start technology allows the engine to automatically shut down and re-start while a vehicle that includes the vehicle powertrain is moving;
   an engine controller for operating the internal combustion engine;
   a transmission connected to the internal combustion engine; and
   a shifter connected to the transmission and the engine controller, the shifter being operable to place the transmission into one of a plurality of operating modes, the operating modes including at least a first mode wherein the stop/start technology is disabled so that the engine does not automatically shut down.

2. The vehicle powertrain of claim 1, wherein the engine controller is operable to implement a speed or acceleration threshold upon receiving an indication of a selection of the first mode.

3. The vehicle powertrain of claim 1, wherein the shifter has a plurality of detents arranged along a path, one corresponding to each operating mode.

4. The vehicle powertrain of claim 3, wherein the operating modes also include at least park, reverse, neutral and drive.

5. The vehicle powertrain of claim 4, wherein the first mode is selectable before drive, but after neutral.

6. The vehicle powertrain of claim 4, wherein the first mode is selectable after drive.

7. The vehicle powertrain of claim 4, wherein the first mode is a sub-mode of drive, such that the mode is selectable without deactivating a shift lock of the transmission.

8. The vehicle powertrain of claim 4, wherein the operating modes further include a manual gear selecting sub-mode of drive, selectable without deactivating a shift lock of the transmission.

9. The vehicle powertrain of claim 8, wherein the first mode is selectable by downshifting from the first available gear in the manual gear selecting sub-mode of drive.

10. The vehicle powertrain of claim 4, wherein the first mode is selectable by actuating a button or switch when drive mode is selected.

11. The vehicle powertrain of claim 1, wherein the engine controller is further operable to disable a navigation system connected to the vehicle powertrain upon receiving an indication of a selection of the first mode.

12. The vehicle powertrain of claim 2, wherein the engine controller is further operable to cause an audible chime or message to be played or a visual cue displayed if the threshold speed is exceeded.

13. The vehicle powertrain of claim 12, wherein the engine controller is further operable to repeat playing the audible chime or message or displaying a visual cue to the driver until the first mode is deselected.

14. The vehicle powertrain of claim 13, wherein the engine controller is further operable to cause the audible chime or message to be played when a sustained acceleration attempt is detected.

15. An operating method for a vehicle having engine stop/start functionality, the operating method comprising:
disabling engine stop/start functionality so that the vehicle can be operated without the vehicle's engine stopping until receipt of a driver command to re-enable stop/start functionality, wherein engine stop/start functionality allows the vehicle's engine to automatically shut down and re-start while the vehicle is moving.

16. The method of claim 15, wherein the driver command comprises selection of a drive mode from a plurality of operating modes, said plurality also including a mode corresponding to the operating method.

17. The method of claim 15, further including monitoring a speed of the vehicle while engine stop/start functionality is disabled to determine if the vehicle speed exceeds a threshold.

18. The method of claim 17, further including playing an audible chime or message or displaying a visual cue to the driver if the threshold speed is exceeded.

19. The method of claim 18, further including repeating playing the audible chime or message or displaying the visual cue to the driver until receipt of the driver command to re-enable stop/start functionality.

20. The method of claim 17, further including, if vehicle speed exceeds the threshold for a predetermined time, re-enabling engine stop/start functionality if the driver command to re-enable stop/start functionality has not been received.

* * * * *